No. 791,821. Patented June 6, 1905.

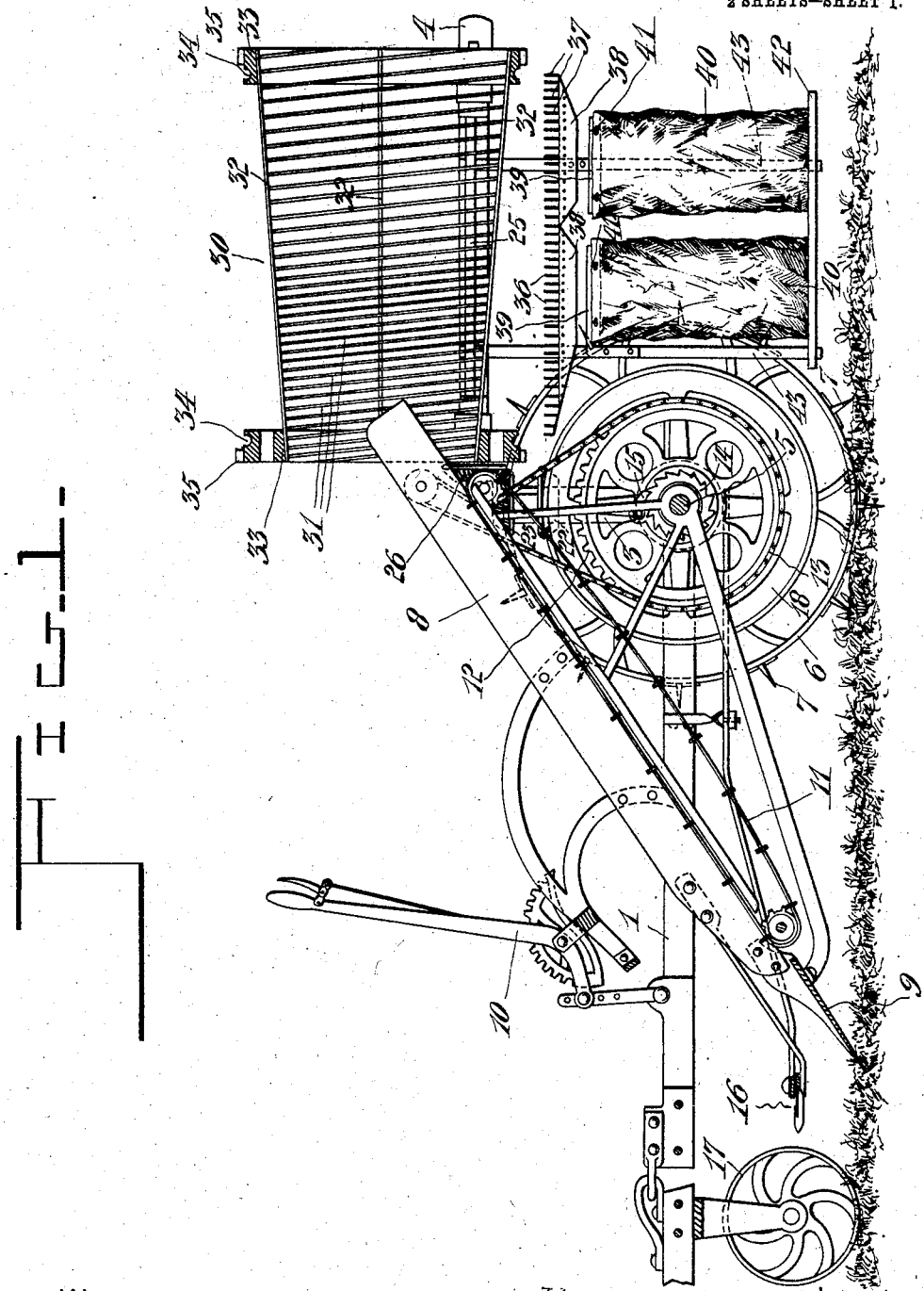

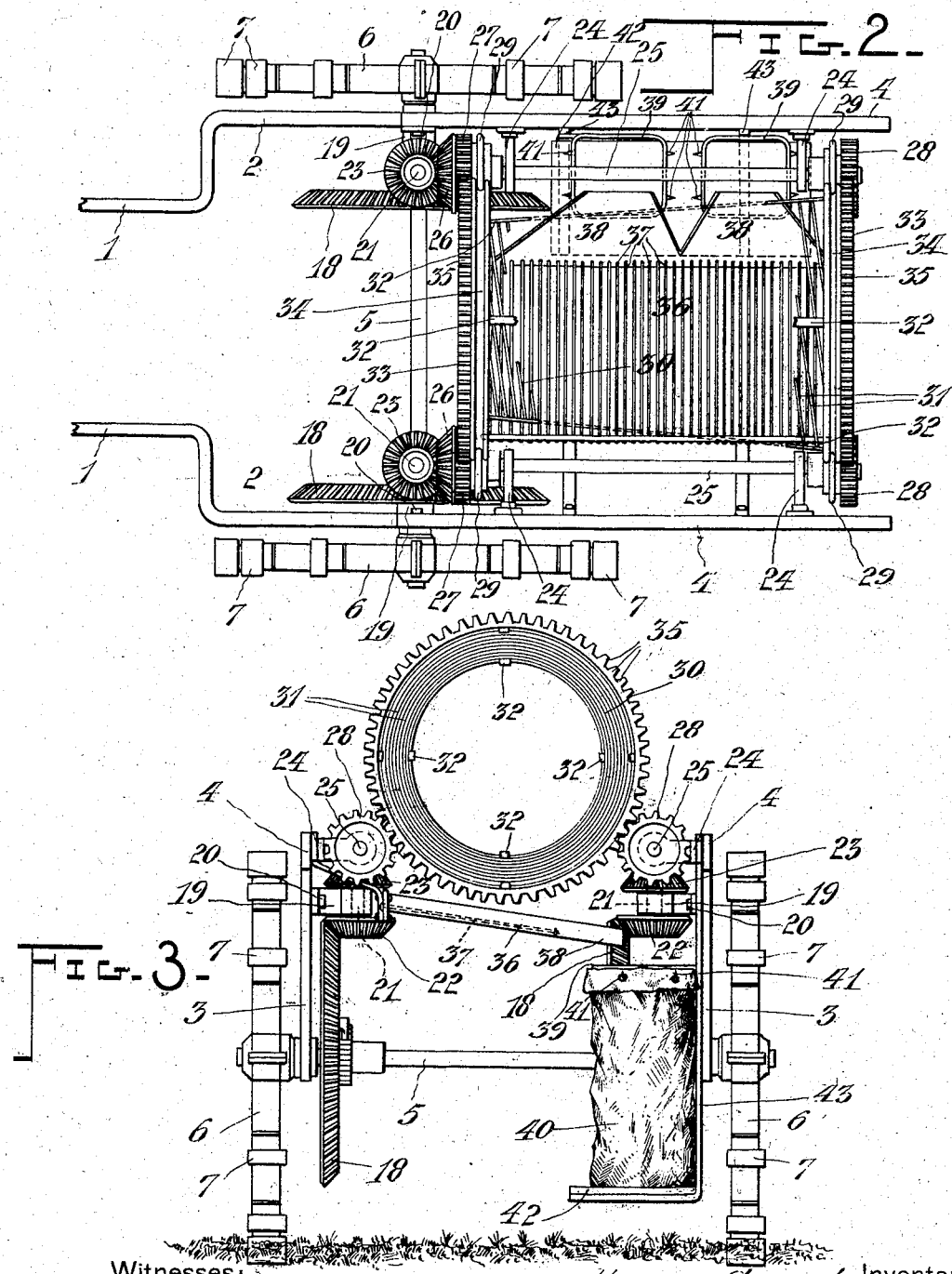

UNITED STATES PATENT OFFICE.

HUGUES SAUVÉ, OF ST. TIMOTHÉE, CANADA.

POTATO-SCREEN.

SPECIFICATION forming part of Letters Patent No. 791,821, dated June 6, 1905.

Application filed February 5, 1904. Serial No. 192,111.

*To all whom it may concern:*

Be it known that I, HUGUES SAUVÉ, a subject of the King of Great Britain, residing at St. Timothée, county of Beauharnois, Province of Quebec, Canada, have invented certain new and useful Improvements in Potato-Screens; and I do hereby declare that the following is a full, clear, and exact description of the invention, such as will enable others skilled in the art to which it appertains to make and use the same.

My invention relates to agricultural implements, and particularly an implement adapted to the sifting and grading of potatoes or similar vegetables—such as turnips, artichokes, &c.—which must be dug from the ground.

The object of my invention is to provide an implement of simple construction which is adapted to be drawn along by a horse or a pair of horses and which will coöperate with a device adapted to raise the potatoes from the ground and which will quickly separate the same from the surrounding earth, so that they may be collected in bags or similar receptacles.

A further object of my invention is to provide means whereby the potatoes after being separated from the surrounding earth will be graded according to their size and deposited in separate receptacles.

In its general construction the invention comprises a substantially horizontal revolving drum or barrel so constructed that the earth adhering to the potatoes will readily fall through the walls thereof. Beneath this drum or barrel is located the grating which catches the potatoes, which eventually fall through the walls of the barrel, and allows the earth to pass without interference. This grating is depressed at one edge, toward which the potatoes gravitate into chutes, which guide the same to receptacles adapted to receive them. My invention further consists in the novel arrangement for actuating said barrel and in the construction and combination of parts to be fully described hereinafter and definitely set forth in the claims.

In the accompanying drawings, forming a part of this application, in which similar reference-numerals indicate corresponding parts, I have illustrated one form of embodiment of my invention, and in which—

Figure 1 is a central longitudinal section, a common form of means for elevating and digging potatoes being illustrated to show the connection of my invention therewith. Fig. 2 is a plan view of my invention separated from said coöperating means, and Fig. 3 is a rear elevation of my invention separated from said elevating and digging means.

Referring to the drawings, 1 designates a frame comprising the substantially parallel members, which for a portion of their length are bent outward, as at 2, and on which are formed vertical extensions 3, and to the vertical extensions are secured lateral extensions 4, or said lateral extensions and vertical extensions may be formed integral with said frame. An axle 5 is rotatably mounted in said frame, preferably at the point of juncture of said vertical extensions 3, and on each outer end of axle is rigidly secured a wheel 6, having on its periphery a plurality of spurs 7 to prevent the wheel slipping. Any common form of elevator-frame, as 8, may be suitably secured to said axle or to said frame, and a plow or scoop 9 may be formed at the lower end of said elevator-frame. A common means 10 for adjusting the elevator-frame is illustrated. An endless-belt conveyer 11 may be suitably mounted on the elevator-frame and actuated, as by a sprocket-wheel 12 and a chain 13. Suitable means for throwing the sprocket-wheel out of gear, as by ratchet-wheel 14 and pawl 15, may be provided. Any usual form of means for removing the vegetation in front of the plow may be provided, as by the cutter 16, and the outer end of the frame may be prevented from sagging, as by the roller 17. It will be understood that the parts in this paragraph described do not form any part of my invention, but are simply described and illustrated to show the connection of my invention therewith.

Secured to the axle 5 are beveled gears 18. On the vertical extensions 3 are secured brackets 19, as by bolts 20. Rotatably mounted in said brackets are vertical shafts 21, each having on its lower end a beveled gear 22 enmesh with the beveled gears 18 and each having on its upper end beveled gear 23 for a purpose hereinafter described.

Suitably secured to the lateral extensions 4 are brackets 24, in which are rotatably mounted shafts 25, on the forward end of each of which is a beveled gear 26, so disposed as to be enmesh with the beveled gear 23 on the upper end of the vertical shaft 21. Adjacent the beveled gears 26, secured on the forward end of each of said shafts 25, is pinion 27, and on the rear end of each of said shafts is secured the pinion 28, which mesh with the gear-teeth 35, provided on the edge of the drum for the purpose of rotating the same. Intermediate of said pinions and adjacent both ends of said shafts are mounted rollers 29. Said rollers afford means for supporting the drum or tumbling-barrel 30, the body of which is formed, preferably, of a continuous bar of stout wire 31, passing helically about longitudinal members 32. The heads 33 of the drum are provided with peripheral grooves 34, which receive said rollers 29 and fix the drum against longitudinal movement.

As illustrated, the drum 30 is preferably disposed with its axis substantially horizontal, and its body is preferably of slightly-tapered or conical shape, the small diameter of the drum being located forwardly. As indicated, the spaces through the wall of the drum between the bars are preferably smaller at the smaller end of the drum for the purpose of retaining larger potatoes therein until they reach the rear end of the drum and from there be deposited in the proper receptacle separate from the smaller potatoes, which will fall between the bars near the forward end of the drum. The common form of elevating means (shown in Fig. 1 of the drawings) extends into the forward end of the drum, so that the potatoes will be readily dropped therein. Below the tumbling-barrel 30 there is secured a grating or riddle 36, the same comprising a plurality of bars 37, which incline at one side toward the chutes 38, and the mouths of these chutes are adapted to deliver through substantially rectangular frames 39, to which bags 40 may be attached by means of the laterally-projecting spurs 41, the said bags resting at their lower ends upon a platform 42, which is attached to the bottom of extensions 43, secured in any suitable way to the frame hereinbefore described.

In the operation of my invention it will be understood that the common form of digging means and elevator will perform the function of digging the potatoes or other vegetables and delivering into the forward end of the tumbling-barrel. The gears 18 being rigidly secured on the shaft 5 will be rotated therewith and will transmit motion to the beveled gears 22, which in turn actuate the shaft 21, on which are carried the gears 23 enmesh with the gears 26. As the gears 26 are fixed on the shafts 25, rotation thereof will cause rotation of the barrel by means of the pinions 27 and 28 engaging with the gear-teeth 35 on the heads of said barrel, and the rollers 29 will effectually support the tumbling-barrel and prevent longitudinal movement of the same. It is obvious from an inspection of the drawings that rotation of the barrel will separate the potatoes from surrounding earth and permit the smaller potatoes to drop through near its forward end and the larger potatoes to drop through near its rear end, both falling upon the grating 36, whence they will be conveyed to the bags 40.

It is obvious that many modifications of my invention may be made without departing from the spirit thereof. Therefore I do not wish to be restricted to the exact forms herein illustrated and described.

Having described my invention, what I claim, and desire to secure by Letters Patent, is—

1. A sifting and grading device, comprising a pair of oppositely-disposed wheels, an axle rigidly secured to and connecting the wheels, a frame supported by the axle, an inclined sifter disposed within the frame, a tapered barrel having its axis in a horizontal plane arranged adjacent to the inclined sifter, means for rotating the barrel, and a grating disposed beneath the barrel.

2. A sifting and grading device, comprising a pair of oppositely-disposed wheels, an axle rigidly secured to and connecting the wheels, a frame supported by the axle, an inclined sifter disposed within the frame, a tapered barrel arranged adjacent to the inclined sifter, comprising longitudinal members and a helical member disposed transversely thereof, means for rotating the barrel, and a grating disposed beneath the barrel.

3. A sifting and grading device, comprising a pair of oppositely-disposed wheels, an axle rigidly secured to and connecting the wheels, a frame supported by the axle, an inclined sifter disposed within the frame, a tapered barrel arranged adjacent to the inclined sifter, comprising longitudinal members and a successively-spaced helical member disposed transversely thereof, means for rotating the barrel, and a grating disposed beneath the barrel.

4. A sifting and grading device, comprising a pair of oppositely-disposed wheels, an axle rigidly secured to and connecting the wheels, a frame supported by the axle, an inclined sifter disposed within the frame, a tapered barrel arranged adjacent to the inclined sifter, heads formed on said barrel, peripheral grooves in said heads, rollers supported adjacent to said heads and working in said grooves to prevent longitudinal movement of the barrel, means for rotating the barrel, and a grating disposed beneath the barrel.

5. A sifting and grading device, comprising a pair of oppositely-disposed wheels, an axle rigidly secured to and connecting the wheels, a frame supported by the axle, an inclined sifter disposed within the frame, a tapered barrel arranged adjacent to the inclined sifter, gear-teeth formed on the periphery of the barrel, pinions arranged adjacent to the barrel and meshing with said gear-teeth to rotate the barrel, and a grating disposed beneath the barrel.

6. A sifting and grading device, comprising a pair of oppositely-disposed wheels, an axle rigidly secured to and connecting the wheels, a frame supported by the axle, an inclined sifter within the frame, a tapered barrel arranged adjacent the upper end of the sifter, gear-teeth on the periphery of the barrel, a grating disposed beneath the barrel, and means for rotating the barrel, comprising gears on the said axle, gears meshing therewith, supported by the frame, shafts carried by the frame, gears on said shaft meshing with said latter gears, and gears on said shaft meshing with the teeth on said barrel.

7. A sifting and grading device, comprising a pair of oppositely-disposed wheels, an axle rigidly secured to and connecting the wheels, a frame supported by the axle, an inclined sifter disposed within the frame, a tapered barrel arranged adjacent the upper end of the sifter, means for rotating the barrel, and an inclined grating disposed beneath the barrel.

8. A sifting and grading device, comprising a pair of oppositely-disposed wheels, a shaft rigidly secured to and connecting the wheels, a frame supported by the axle, an inclined sifter disposed within the frame, a rotatable barrel arranged adjacent to the upper end of the inclined sifter, means for rotating the barrel, means for preventing longitudinal movement of the barrel, and an inclined grating disposed beneath the barrel, comprising a plurality of transversely-disposed, parallel members.

9. A sifting and grading device, comprising a pair of oppositely-disposed wheels, an axle rigidly secured to and connecting the wheels, a frame supported on the axle, an inclined sifter disposed within the frame, a tapered, rotatable, barrel arranged adjacent the upper end of the sifter, means for rotating the barrel, an inclined grating disposed beneath the barrel, a chute arranged adjacent the lower edge of the grating, and means for maintaining a receptacle adjacent said chute.

10. A sifting and grading device comprising a pair of oppositely-disposed wheels, an axle rigidly secured to and connecting the wheels, a frame supported on the axle, an inclined sifter disposed within the frame, a tapered, rotatable barrel arranged adjacent to the upper end of the sifter, means for rotating the barrel, an inclined grating disposed beneath the barrel, a chute arranged adjacent the lower edge of the grating, a rectangular frame below the chute, and spurs on said frame adapted to hold a receptacle.

11. A sifting and grading device, comprising a pair of oppositely-disposed wheels, an axle rigidly secured to and connecting the wheels, a frame supported on the axle, an inclined sifter disposed within the frame, a tapered, rotatable barrel arranged adjacent to the upper end of the sifter, means for rotating the barrel, an inclined grating disposed beneath the barrel, a chute arranged adjacent the lower edge of the grating, a rectangular frame below the chute, spurs on the rectangular frame adapted to hold a receptacle in operative position, and a platform depending below the frame, adapted to sustain the weight of said receptacle.

12. A sifting and grading device, comprising a pair of oppositely-disposed wheels, an axle rigidly secured to the wheels and connecting the same, a frame supported by the axle, an inclined sifter disposed within the frame, a tapered, rotatable barrel disposed adjacent the upper end of the sifter, means for rotating the barrel when the said wheels are turned, means to prevent such rotation, and a grating disposed beneath the barrel.

In witness whereof I have hereunto set my hand in the presence of two witnesses.

HUGUES SAUVÉ.

Witnesses:
T. MYNARD,
M. HANLEY.